(12) United States Patent
Fujita

(10) Patent No.: US 6,260,671 B1
(45) Date of Patent: Jul. 17, 2001

(54) DOUBLE-WRAP BRAKE BAND APPARATUS

(75) Inventor: Kazuyuki Fujita, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/659,005

(22) Filed: Sep. 11, 2000

(30) Foreign Application Priority Data

Sep. 13, 1999 (JP) ................................. 11-258828

(51) Int. Cl.[7] ................................. F16D 51/00
(52) U.S. Cl. ........................ 188/77 W; 188/259
(58) Field of Search ............... 188/77 W, 77 K, 188/250 H, 259, 249, 250 D, 75, 336, 337, 338, 339; 475/126, 128, 116; 29/418

(56) References Cited

U.S. PATENT DOCUMENTS

| | | | |
|---|---|---|---|
| 4,602,706 | * | 7/1986 | Blinks et al. ........................ 188/259 |
| 4,757,880 | * | 7/1988 | Grzesiak ............................ 188/77 W |
| 5,012,905 | * | 5/1991 | Tanaka .............................. 188/250 H |
| 5,083,642 | * | 1/1992 | Stefanutti et al. ................. 188/77 W |
| 5,588,928 | * | 12/1996 | Koivunen ............................. 475/126 |

* cited by examiner

Primary Examiner—Robert J. Oberleitner
Assistant Examiner—Melanie Torres
(74) Attorney, Agent, or Firm—Miles & Stockbridge P.C.

(57) ABSTRACT

Provided is a brake band apparatus which is simple in mechanism and improved in the life of a frictional material, and particularly a double-wrap brake band apparatus provided with outer bands having a frictional material secured to the inner peripheral surface thereof, an intermediate band interposed between the outer bands and having a frictional material secured to the inner peripheral surfaces thereof, a coupling portion for coupling one end portion of each of the outer bands and one end portion of the intermediate band in the circumferential direction thereof, an apply bracket integral with or discretely from the coupling portion, a first anchor bracket on the free ends of the outer bands in the circumferential direction thereof, a second anchor bracket on the free end of the intermediate band in the circumferential direction thereof, and an actuator for giving a load in two directions to the apply bracket.

6 Claims, 7 Drawing Sheets

DOUBLE-WRAP BRAKE BAND APPARATUS

BACKGROUND OF THE INVENTION

1. Field of the Invention

This invention relates to a brake band apparatus for use in the automatic transmission of a vehicle, a construction machine, an agricultural machine or the like.

2. Related Background Art

A one-wrap brake band has heretofore been used in a brake band apparatus for fastening with a self-engaging force exerted on the rotation of a drum (inner ring) in both directions. FIG. 8 of the accompanying drawings is a side view showing a brake band apparatus 51 according to the prior art.

The brake band apparatus 51 is comprised of a rotatable drum 52, a substantially C-shaped brake band 61 disposed on the outer periphery of the drum 52, and two actuators 71 and 81 for giving a load to the brake band 61.

The brake band 61 is comprised of a band 62, a frictional material 63 secured to the inner peripheral surface of the band 62, and brackets 66 and 67 fixed to the opposite end portions of the band 62 which are free ends.

The two actuators 71 and 81 are identical and therefore, only the construction of one actuator 71 will be described. The actuator 71 is comprised of a substantially cylindrical case 75, an oil chamber 73 provided in the case 75, an oil supply hole 77 leading to the oil chamber 73, a hole 78 for letting pneumatic pressure created in a void 72 escape outwardly, a piston 74 sliding on the inner wall of the case 75, and a rod 79 provided integrally with the piston 74. Further, in the void 72, a return spring 80 is mounted around the rod 79.

The operation of this brake band apparatus is such that oil pressure is supplied to the oil chamber 73 through the oil supply hole 77 to thereby create a load to the brake band 61, and fasten the drum 52. On the other hand, to liberate the fastening state of the brake band 61, the oil pressure in the oil chamber 73 is drawn, and the piston 74 and the rod 79 are retracted by the biasing force of the return spring 80, and the band 62 is restored.

The operating state of the apparatus at this time is shown in FIG. 9 of the accompanying drawings. In FIG. 9, the rotational direction of the drum 52 is a counter-clockwise direction (indicated by arrow in drawings) and therefore, oil pressure is supplied to the oil chamber 73 of the actuator 71, the piston 74 is moved rightwardly as viewed in FIG. 9, and the rod 79 mounted on the piston 74 biases the bracket. The bracket 67 provided on the other end of the band 61 cannot be moved because a rod 89 abuts against it in a fixed state. By this construction, the brake band 61 fastens the drum 52.

The rod 89 supporting the bracket 67 may be completely fixed, but it has also been practised to support the bracket so that the rod 89 may deviate somewhat rightwardly as viewed in the figure so as to alleviate the shock to the band 62 during fastening in conformity with the coefficient of friction of the frictional material 63 which is fluctuated by the environment such as the temperature of lubricating oil.

On the other hand, when the rotational direction of the drum 52 is clockwise, the operations of the actuators 71 and 81 become opposite to what has been described above, as shown in FIG. 10. Also, the function of alleviating the above-mentioned shock occurring during fastening is likewise performed by the operation of the other actuator 71 when the rotation of the drum 52 is opposite in direction (the direction of arrow).

The direction of the above-described load to the brake band 61 is the direction in which the drum 52 is rotated (hereinafter referred to as the rotational direction side), and by the direction being made identical, the self-engaging force of the brake band 62 works and the drum 52 is fastened. The torque capacity of the brake band by this self-engaging force is represented by the following expression:

$$T = F \cdot R \cdot (e^{\mu \beta} - 1)$$

where T: torque, F: load (apply), R: the outer diameter of the drum, e: natural logarithm, $\mu$: coefficient of friction, $\beta$: angle of contact.

However, the above-described brake band apparatus according to the prior art is complicated in mechanism and control because two actuators need be provided. Also, the frictional material secured to the inner peripheral surface of the brake band must receive rotations in two directions and is high in frequency of use, and this has led to the problem that the life thereof becomes short.

SUMMARY OF THE INVENTION

So, the present invention has as its task to provide a brake band apparatus which is simple in mechanism and improved in the life of a frictional material.

In order to solve the above task, a first aspect of the invention is a double-wrap brake band apparatus provided with outer bands having a frictional material secured to the inner peripheral surfaces thereof, an intermediate band interposed between the outer band and having a frictional material secured to the inner peripheral surface thereof, a coupling portion for coupling one end portion of each of the outer bands and one end portion of the intermediate band in the circumferential direction thereof, an apply bracket provided integrally with or discretely from the coupling portion, a first anchor bracket provided on the free ends of the outer bands in the circumferential direction thereof, a second anchor bracket provided on the free end of the intermediate band in the circumferential direction thereof, and an actuator for giving a load in two directions to the apply bracket.

A second aspect of the invention is a double-wrap brake band apparatus according to the first aspect of the invention, wherein the direction of the load is the rotational direction side of the drum.

A third aspect of the invention is a double-wrap brake band apparatus according to the first aspect of the invention, wherein the actuator is single.

A fourth aspect of the invention is a double-wrap brake band apparatus wherein the actuator is provided with a connecting portion for a rod mounted integrally on a piston operated in response to fluid pressure and the apply bracket, and the portion of contact between the connecting portion and the apply bracket is arcuate.

A fifth aspect of the invention is a double-wrap brake band apparatus wherein the characteristics of the frictional material secured to the intermediate band and the frictional material secured to the outer bands differ from each other.

The anchor bracket refers to a receiving member used to fix, and the apply bracket refers to a receiving member for receiving the load.

DESCRIPTION OF THE PREFERRED EMBODIMENTS

Figure 1:
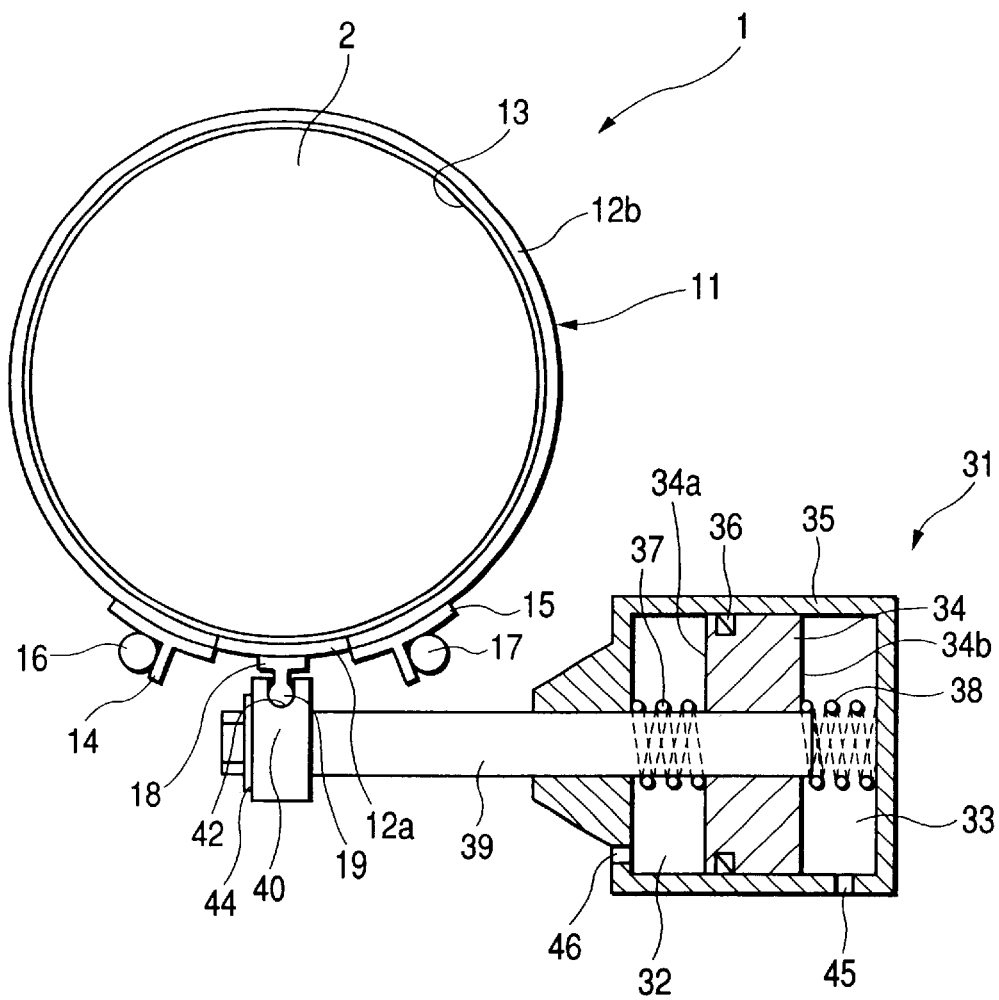
FIG. 1 is a side view showing a brake band apparatus according to a first embodiment of the present invention.

The present apparatus is constructed of a double-wrap band disposed on the outer periphery of a rotatable drum, and a piston for giving a load to the double-wrap band. Anchor brackets are provided on the opposite end portions of the double-wrap band, and an apply bracket is provided on the substantially central portion thereof.

The piston provided in a single actuator for giving the load is moved back and forth with a predetermined reference point as the center, and gives a load in two directions to a brake band. The directions are the tangential directions in the rotational direction of a drum.

The apply bracket is provided with a head of a substantially circular cross-sectional shape, and the connecting portion of the actuator is also provided with a depression having a substantially U-shaped cross-section conforming to the shape of the head.

The double-wrap band is comprised of an intermediate band and two outer bands, and when it receives a load in one direction, the drum is fastened by only the intermediate band, and when it receives a load in the other direction, the drum is fastened by only the outer bands.

Further, the brake band apparatus according to the present invention is an apparatus which operates one wrap of the double-wrap brake band in conformity with the rotational direction.

The torque capacity at this time can be arbitrarily set by the kind of the frictional material used and the load (F) and therefore, it is possible both to make the torque capacities of the intermediate band and the two outer bands equal to each other and to provide a difference therebetween.

Also, the frictional material secured to the intermediate band and the frictional material secured to the outer bands may differ in characteristic from each other, and for example, one band may be used to fasten the rotating drum, and the other may be used to hold the stationary drum as it is.

Embodiments of the double-wrap brake band apparatus according to the present invention used in the brake of an automatic transmission, a construction machine, an agricultural machine or the like will hereinafter be described with reference to FIGS. 1 to 7. In the drawings, like portions are designated like reference characters.

Figure 2:
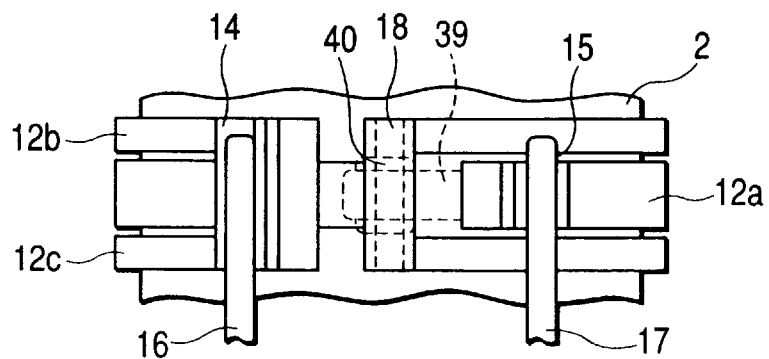
FIG. 2 is a front view of the brake band apparatus shown in FIG. 1.

FIG. 1 is a side view showing a first embodiment of the brake band apparatus according to the present invention, and FIG. 2 is a front view of the brake band of the brake band apparatus of FIG. 1. As shown in FIG. 1, the brake band apparatus 1 has a drum 2, a brake band 11, a single actuator 31 and anchor pins 16 and 17. The substantially C-shaped double-wrap brake band 11 is disposed on the outer periphery of the drum (inner ring) 2.

The construction of the brake band 11 will hereinafter be described in detail with reference to FIG. 2. The brake band 11 is comprised of an intermediate band 12a, outer bands 12b, 12c, a frictional material 13 (see FIG. 1) secured to the inner periphery of each of the bands 12a, 12band 12c, anchor brackets 14, 15 and an apply bracket 18.

In the present embodiment, the apply bracket 18 is provided substantially on the center of the brake band 11. The present invention, however, does not restrict the position of the apply bracket to the center of the brake band.

The apply bracket 18 is fixed to the outer peripheral surface of circumferential one end portion of each of the outer bands 12b end 12c by caulking (not shown), welding or the like, and the anchor bracket 14 for receiving an anchor pin 16 is fixed to the outer peripheral surfaces of the circumferential other end portions thereof which are free ends by caulking, welding or the like (not shown).

On the other hand, the apply bracket 18 is fixed to the outer peripheral surface of one end portion of the intermediate band 12a by caulking, welding or the like (not shown). Also, the other end portion of the intermediate band 12a is a free end, and is opposed to the apply bracket 18 with a gap in the circumferential direction.

Further, in the circumferential direction, in a direction (rightward direction as viewed in FIG. 1) opposed to the direction (leftward direction as viewed in FIG. 1) in which the intermediate band 12a extends from the apply bracket 18, the outer bands 12b and 12c extend from the apply bracket 18. That is, this is such a construction that one end portion which is the free end of the intermediate band 12a and one end portion which is the free end of each of the outer bands 12b and 12c are circumferentially opposed to each other with the apply bracket 18 interposed therebetween.

The first anchor bracket 15 is integrally provided on the free end of the intermediate band 12a by caulking or welding, and the second anchor bracket 14 is integrally provided on the free ends of the outer bands 12b and 12c by caulking or welding. The first anchor bracket 15 and the second anchor bracket 14 can abut against the anchor pins 17 and 16, respectively, and by abutting, the anchor brackets 14 and 15 are positioned by the anchor pins 17 and 16, respectively, and are limited in the movement thereof in a direction in which the brake band 11 opens.

The actuator 31 for giving a load to the brake band 11 is shown in FIG. 1. The actuator 31 is comprised of a case 35 having a substantially cylindrical internal space, a rod 39 concentric with the case and protruding and extending from the case, and a connecting member 40 mounted on one end of the rod 39.

The connecting member 40 is engaged with the apply bracket 18, and transmits the load from the actuator 31 to the brake band 11.

Further, in the internal space of the case 35, a substantially disc-shaped piston 34 is mounted on the other end of the rod 39 concentrically and integrally with the rod 39. The piston 34 has an outer peripheral surface slidable relative to the inner side wall of the case, and on the outer peripheral surface, an O-ring 36 interposed between it and the inner side wall is mounted.

A space defined by that end surface 34a of the piston 34 which is adjacent to the connecting member and the inner surface of the case 35 is a first oil chamber 32. In the first oil chamber, a spring 37 is mounted around the rod 39.

On the other hand, a space defined by the end surface 34b of the piston 34 and the inner surface of the case 35 is a second oil chamber 33. In the second oil chamber 33, a spring 38 is provided between the end surface 34b of the piston 34 and the axial end surface of the case 35. By the biasing forces of these two springs 37 and 38, the piston 34 is supported at a predetermined reference position in the internal space of the case 35.

Also, an oil inlet and outlet 46 communicating with the first oil chamber 32 is provided in that wall of the case 35 which is adjacent to the connecting member, and an oil inlet and outlet 45 communicating with the second oil chamber 33 is provided in that side wall of the case 35 which is adjacent to the second oil chamber.

Figure 3:
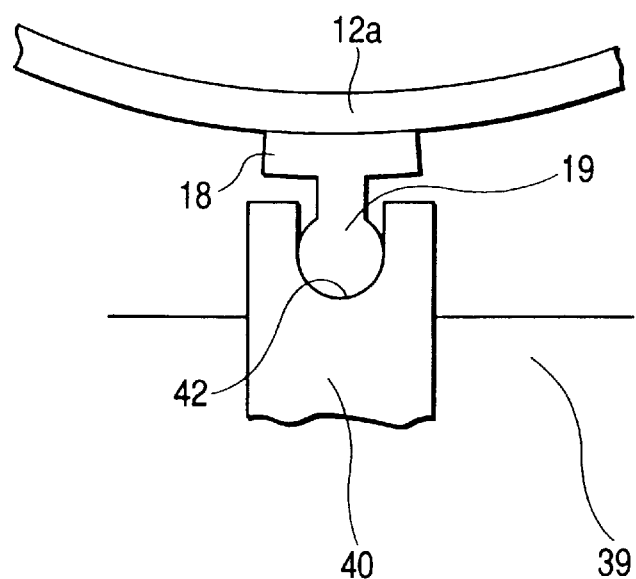
FIG. 3 is an enlarged side view of the engaged portion between the apply bracket and connecting member of the brake band apparatus shown in FIG. 1.

FIG. 3 is an enlarged fragmentary view showing the engaged portion between the apply bracket 18 and the connecting member 40. A head 19 of a substantially circular cross-sectional shape is provided on the central portion of the apply bracket 18, and a depression 42 having a substantially U-shaped cross-section capable of containing the head 19 therein is provided in the connecting member 40. By adopting such shapes, the movement of the coupling portion between the head 19 and the depression 42 becomes smooth during operation, i.e., when the rod 39 moves in the axial direction thereof.

Figure 4:
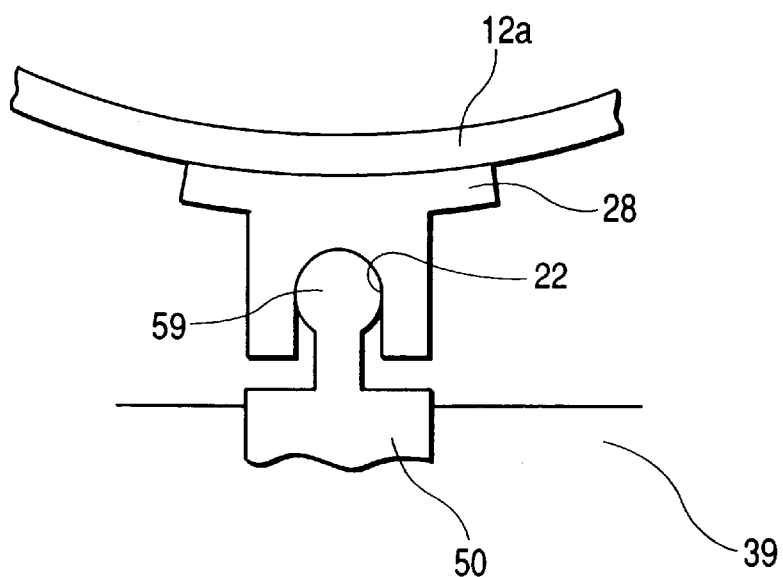
FIG. 4 is an enlarged side view showing another embodiment of the engaged portion.

While the first embodiment adopts a construction in which the head 19 is provided on the apply bracket 18 and the depression 42 is provided in the connecting member 40, a converse construction may also be adopted as shown in FIG. 4. That is, a depression 22 having a substantially U-shaped cross-section may be provided in an apply bracket 28, and a head 59 of a substantially circular cross-sectional shape may be provided on the central portion of a connecting member 50. The smoothness of the movement in the engaged portion between the head 59 and the depression 22 is the same as that in the engaged portion shown in FIG. 3.

Figure 5:
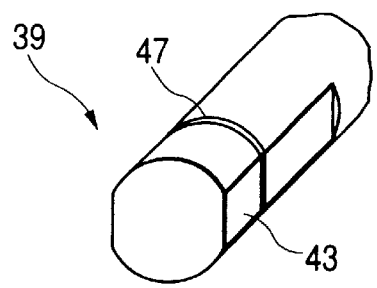
FIG. 5 is a perspective view showing the distal end portion of the rod of the actuator of the brake band apparatus shown in FIG. 1.

FIG. 5 is a perspective view of one end portion of the rod 39 in which the connecting portions 40 and 50 are mounted. A flat surface 43 is provided on the distal end portion of the rod 39. Further, in the distal end portion of the rod 39, a groove portion 47 for attaching a snap ring 44 (see FIG. 1) thereto is formed in a direction vertical to the axis of the rod. This connecting member 40 is engaged with the apply bracket 18, whereby the load from the actuator is transmitted to the brake band.

On the other hand, the connecting member 40 is formed with a hole, not shown, extending axially thereof and capable of fitting to the flat surface 43, and after the connecting member 40 is mounted on the rod 39, the snap ring 44 is mounted on the groove portion 47 to thereby prevent the connecting member 40 from slipping off from the rod 39.

Figure 6:
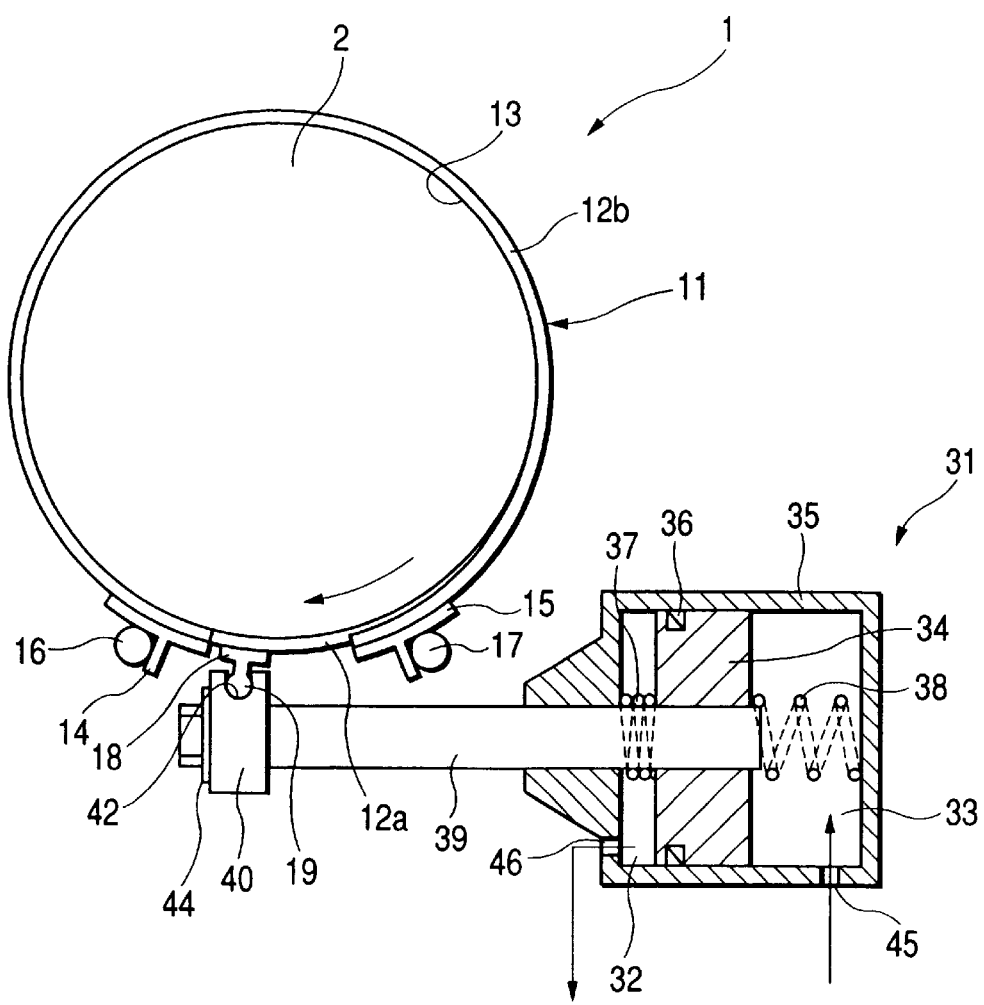
FIG. 6 is a side view showing a state in which the brake band apparatus shown in FIG. 1 is operating to the clockwise rotation of a drum.

The operative state of the brake band apparatus according to the first embodiment of the present invention will now be described in detail with reference to the drawings. FIG. 6 shows the operative state of the brake band apparatus 1. The drum 2 is clockwisely rotating. When fluid under pressure (oil or the like) is supplied to the second oil chamber 33 of the actuator 31 through the second oil inlet and outlet 45 to adjust the movement direction of the connecting member 40 to the rotational direction of the drum 2, the oil pressure rises and the piston 34, the rod 39 and the connecting member 40 connected to the piston 34 are moved leftwardly as viewed in FIG. 6, and a load is given to the band 11 through the apply bracket 18. Thereupon, the fixed ends of the outer bands fixed to the apply bracket 18 are moved so as to approach the free end restrained by the anchor bracket 16, thus fastening the drum 2. At this time, the aforementioned self-engaging force is working.

Conversely, to liberate the fastening of the drum 2 by the band 11, the fluid under pressure in the oil chamber 33 is discharged to thereby reduce the oil pressure. When the oil pressure in the oil chamber 33 is reduced, the piston 34 is pushed back to a reference position in the internal space of the case 35 by the resilient forces of the springs 37 and 38.

Figure 7:
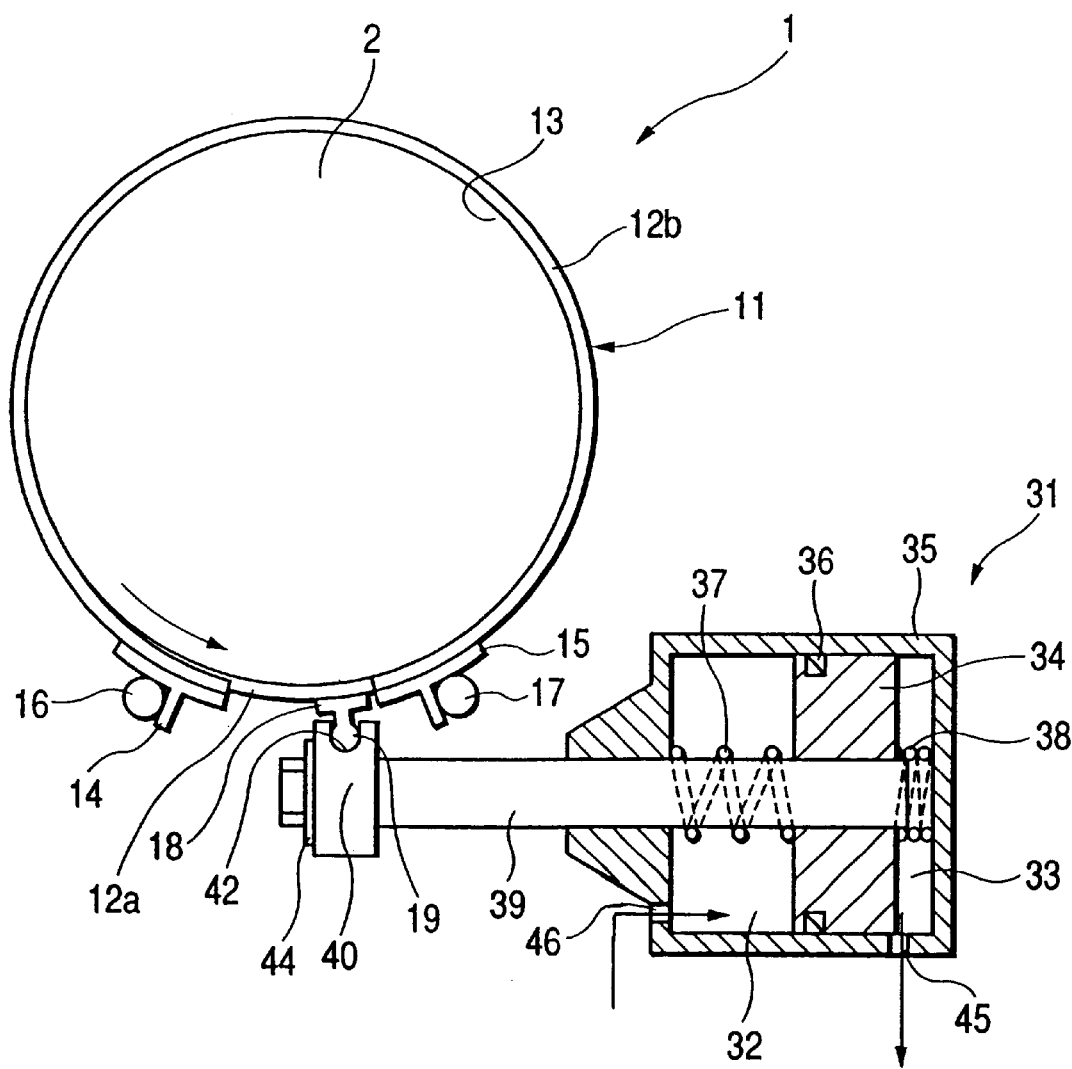
FIG. 7 is a side view showing a state in which the brake band apparatus shown in FIG. 1 is operating to the counter-clockwise rotation of the drum.
Figure 8:
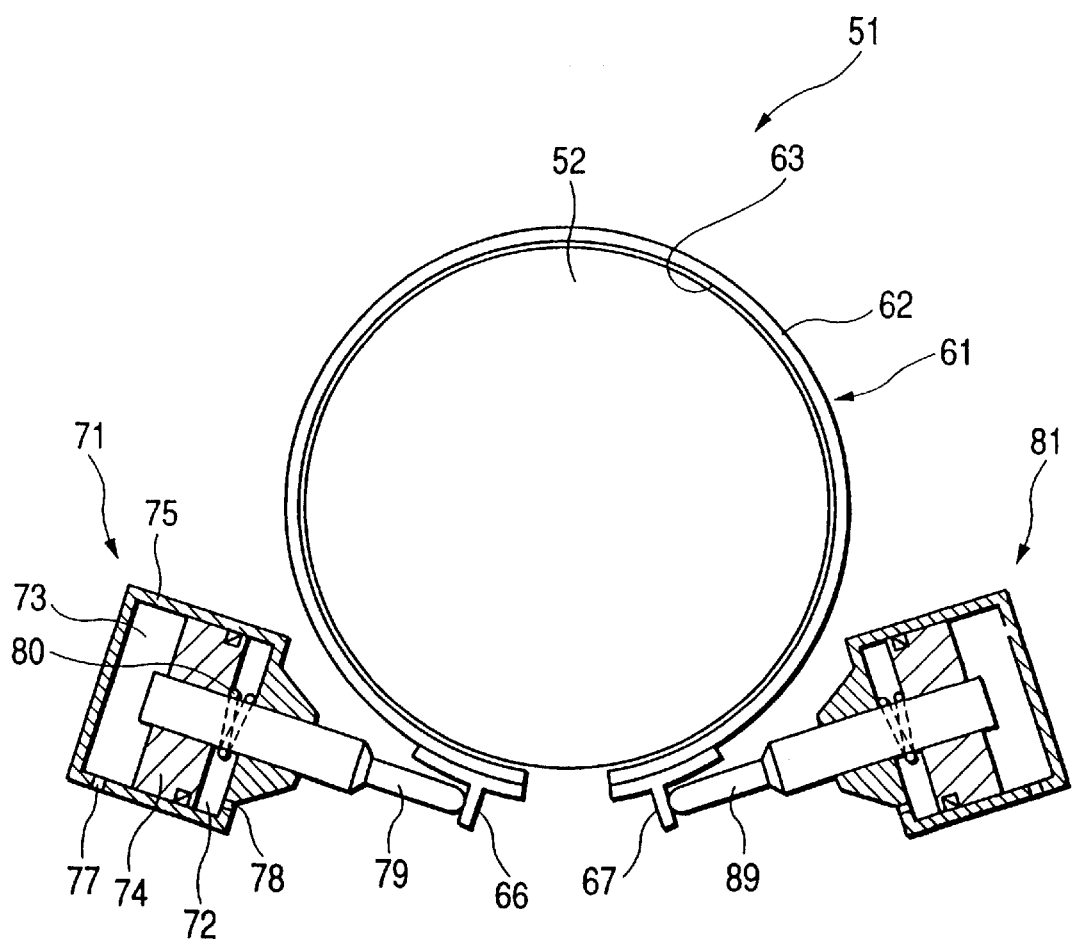
FIG. 8 is a side view showing a brake band apparatus according to the prior art.
Figure 9:
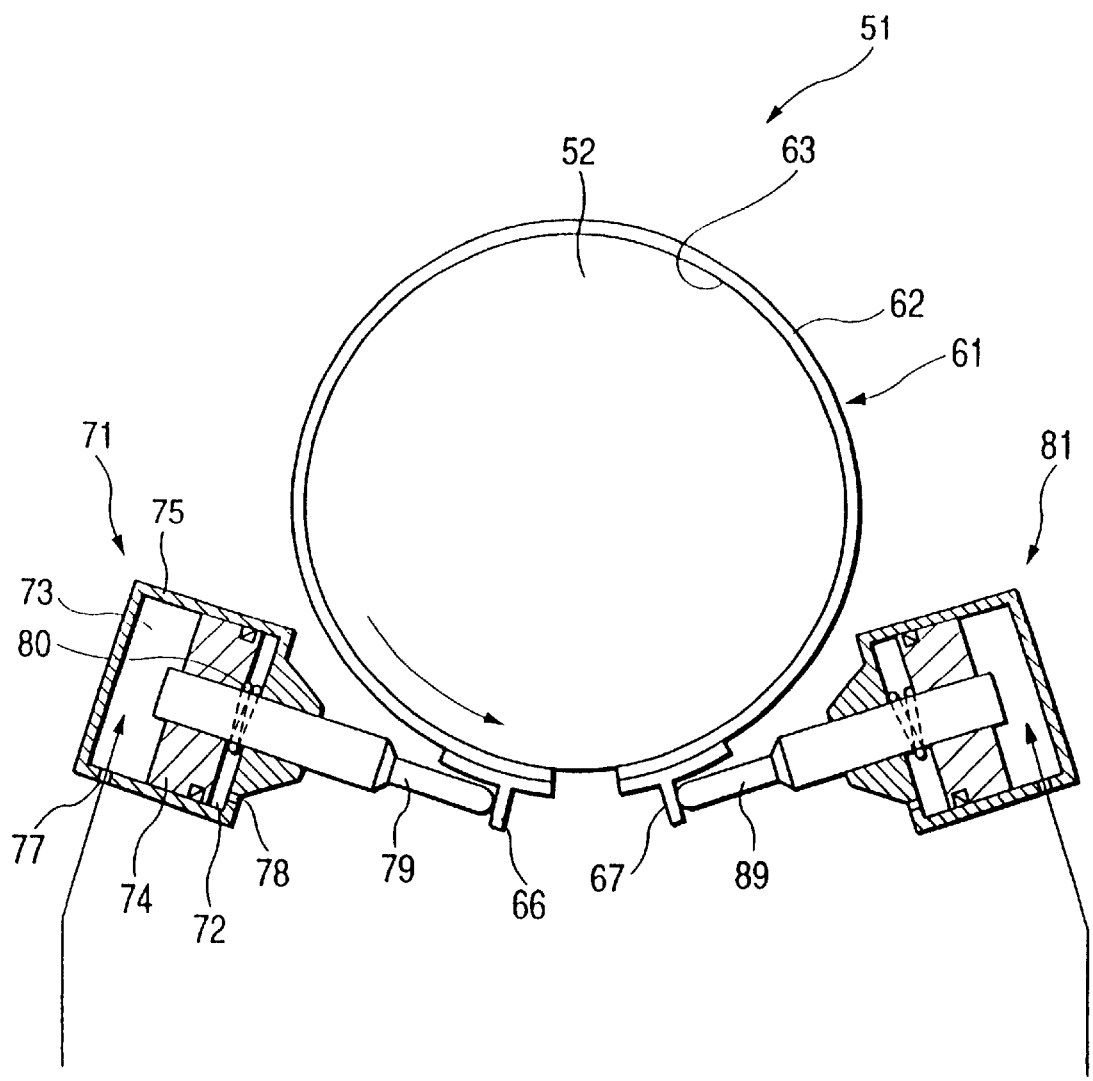
FIG. 9 is a side view showing a state in which the brake band apparatus of FIG. 8 operates to the clockwise rotation of a drum.
Figure 10:
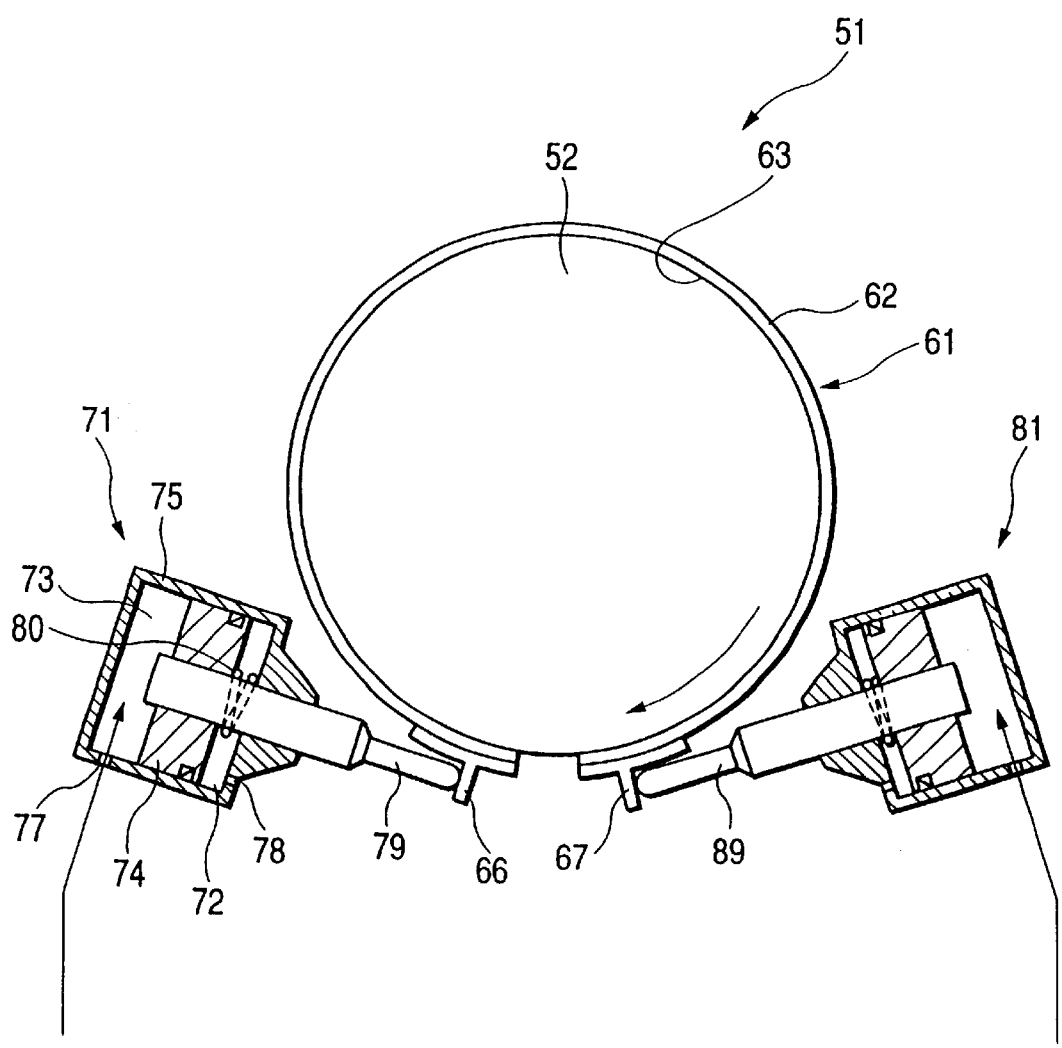
FIG. 10 is a side view showing a state in which the brake band apparatus of FIG. 8 operates to the counter-clockwise rotation of the drum.

FIG. 7 is a side view of the brake band apparatus 1 showing a state in which the band 11 is fastening the drum 2 when the drum 2 is rotating counter-clockwisely. In this case, when the fluid under pressure is supplied to the first oil chamber 32 through the first oil inlet and outlet 46, the oil pressure rises and the piston 34, the rod 39 and the connecting member 40 are moved rightwardly as viewed in FIG. 7, and a load is given to the band 11 through the apply bracket 18. Thereupon, the fixed end of the intermediate band fixed to the apply bracket 18 moves so as to approach the free end restrained by the anchor bracket 17, thus fastening the drum 2. At this time, only the intermediate band 12a operates and fastens the drum 2. To liberate the fastening by the intermediate band 12a, the fluid under pressure in the first oil chamber 32 is discharged to thereby reduce the oil pressure, as previously described.

While the actuator 31 returns the piston 34 to the reference position by the resilient forces of the springs, the piston can also be returned to the reference position by uniform oil pressure being applied to the first and second oil chambers. Also, frictional materials having different properties can be secured to the outer bands 12b, 12c and the intermediate band 12a to thereby give them different characteristics depending on the rotational direction of the drum 2. For example, a frictional material taking the shock during fastening into account can be secured to the intermediate band 12a, while on the other hand, a frictional material attaching importance to the heat resisting property and durability can be secured to the outer bands.

The present invention is carried out by the above-described construction and achieves the following effects.

By the first aspect of the invention, the frequency of use of the frictional materials could be reduced and the life thereof could be lengthened.

By the second aspect of the invention, the band of the brake band apparatus could be fastened with the self-engaging force exerted relative to any rotational direction.

Also, by the third aspect of the invention, there could be provided a brake band apparatus of simple construction provided only one actuator.

Further, by the fourth aspect of the invention, the movement of the engaged portion between the connecting member and the apply bracket could be smoothed during the operation of the brake band apparatus.

Also, by the fifth aspect of the invention, the brake band apparatus could be made functionally multiple and the present brake band apparatus because usable in a wide range.

What is claimed is:

1. A double-wrap brake band apparatus for fastening a rotatable drum through a band disposed on the outer periphery of said drum, comprising:

outer bands having a frictional material secured to the inner peripheral surfaces thereof;

an intermediate band interposed between said outer bands and having a frictional material secured to the inner peripheral surface thereof;

a coupling portion for coupling one end portion of each of said outer bands and one end portion of said intermediate band in the circumferential direction thereof;

an apply bracket provided integrally with or discretely from said coupling portion;

a first anchor bracket provided on the free ends of said outer bands in the circumferential direction thereof;

a second anchor bracket provided on the free end of said intermediate band in the circumferential direction thereof; and an actuator for giving a load in two directions to said apply bracket.

2. A double-wrap brake band apparatus according to claim 1, wherein the direction of said load is the rotational direction side of said drum.

3. A double-wrap brake band apparatus according to claim 1, wherein said actuator is single.

4. A double-wrap brake band apparatus according to claim 1, wherein said actuator is provided with a connecting portion for a rod mounted integrally on a piston operated in response to fluid pressure and said apply bracket, and the portion of contact between said connecting portion and said apply bracket is arcuate.

5. A double-wrap brake band apparatus according to claim 3, wherein said actuator is provided with a connecting portion for a rod mounted integrally on a piston operated in response to fluid pressure and said apply bracket, and the portion of contact between said connecting portion and said apply bracket is arcuate.

6. A double-wrap brake band apparatus according to claim 1, wherein the characteristics of the frictional material secured to said intermediate band and the frictional material secured to said outer bands differ from each other.

* * * * *